UNITED STATES PATENT OFFICE.

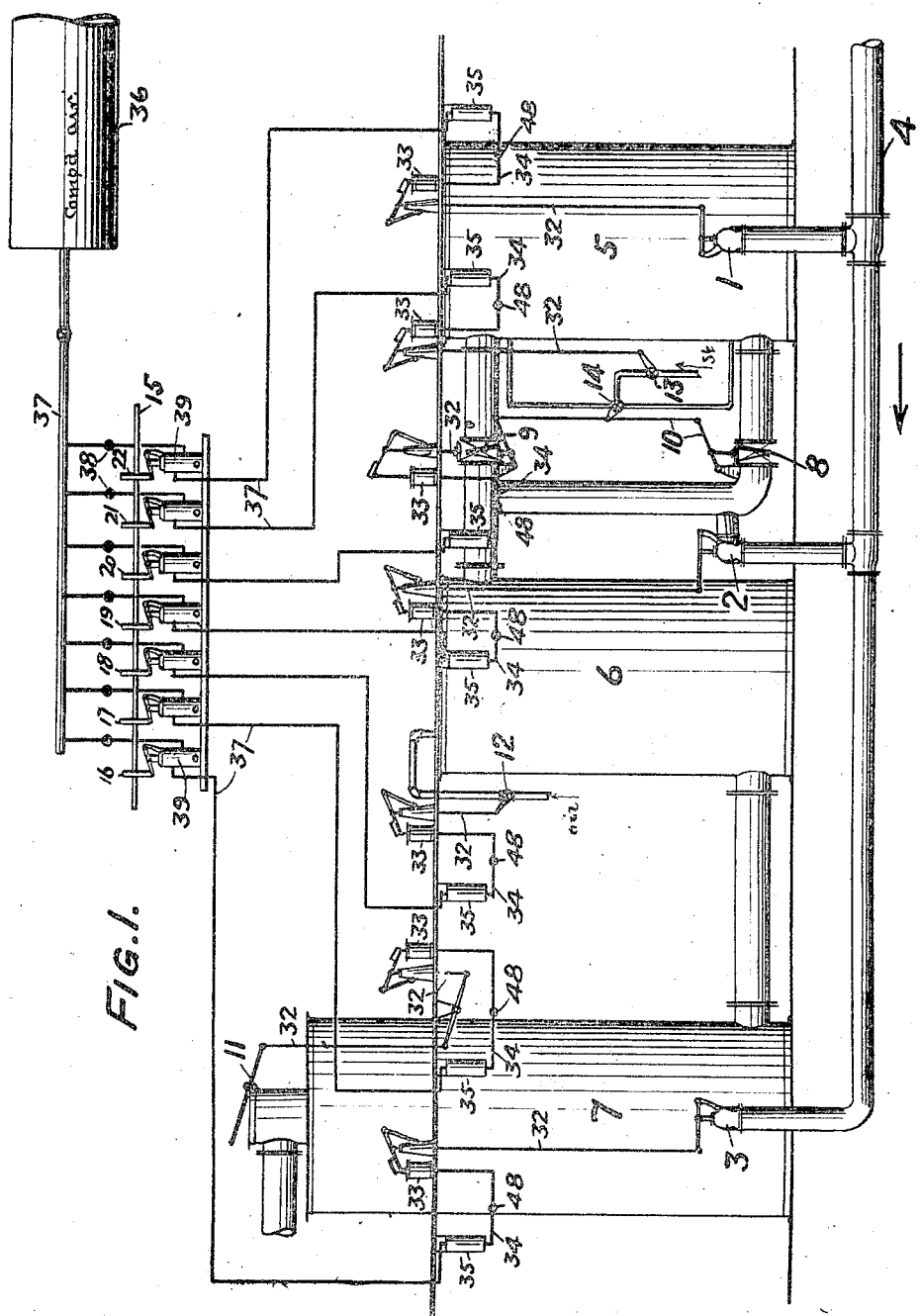

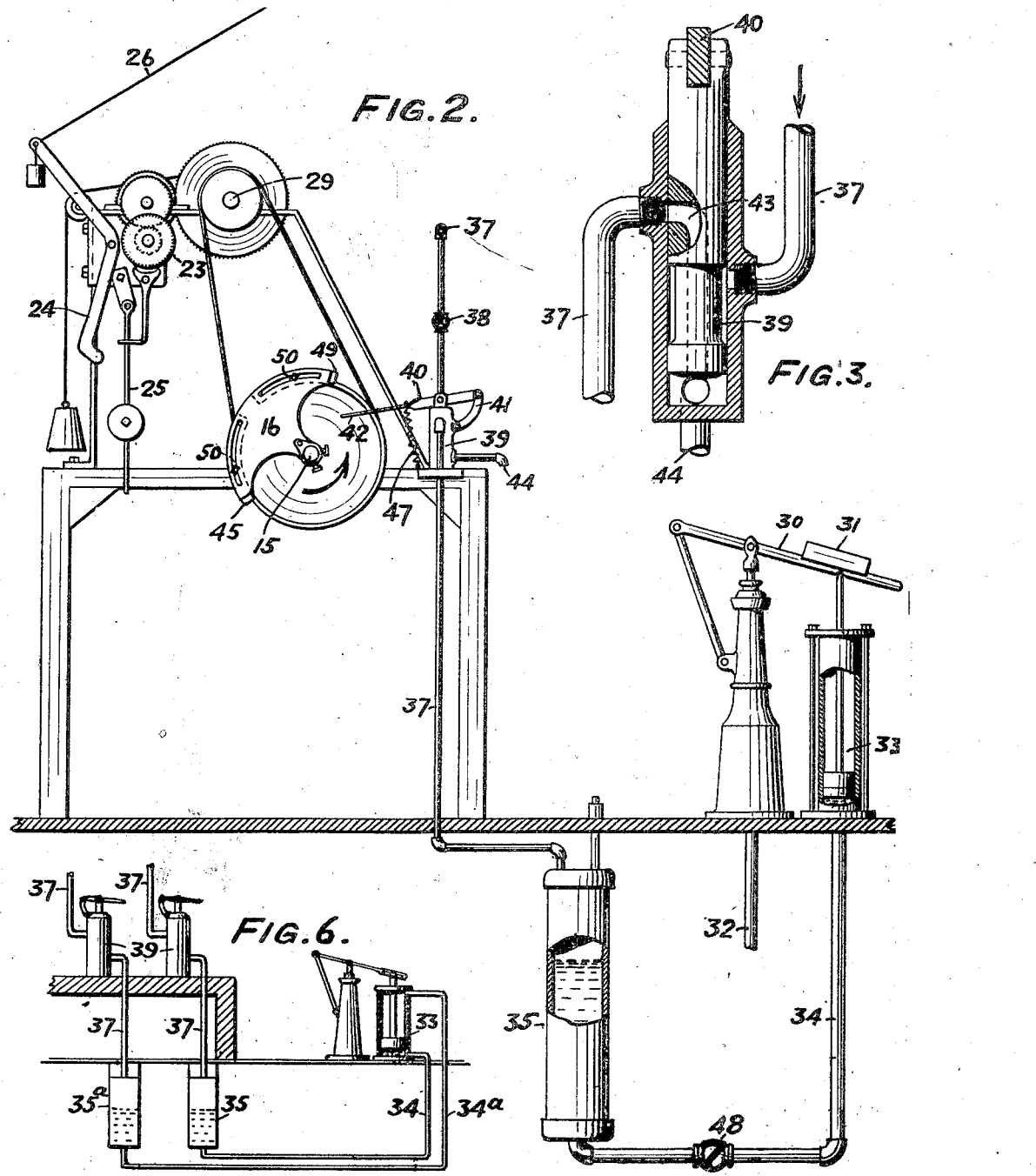

CHARLES FRANKLIN ZEEK, OF PENSACOLA, FLORIDA, ASSIGNOR TO THE UNITED GAS IMPROVEMENT COMPANY, OF PHILADELPHIA, PENNSYLVANIA, A CORPORATION OF PENNSYLVANIA.

MANUFACTURE OF WATER-GAS.

1,152,869.   Specification of Letters Patent.   Patented Sept. 7, 1915.

Application filed March 21, 1914. Serial No. 826,199.

*To all whom it may concern:*

Be it known that I, CHARLES FRANKLIN ZEEK, a citizen of the United States, and a resident of Pensacola, in the county of Escambia and State of Florida, have invented certain new and useful Improvements in the Manufacture of Water-Gas, of which the following is a specification.

The principal object of the present invention is first, to make the operation of a water gas apparatus automatic, thereby obtaining better and more certain results, and to operate with unskilled labor, so effecting economy; second, to guard against accidents that might result from failure of the automatic apparatus or control, and to provide for effecting the comparatively large lift or travel of certain of the valves in a relatively short time through the intervention of mechanism which is operated slowly and at comparatively frequent intervals, and third, to control the lift or opening of the valves so that it may not occur any more rapidly than is appropriate and desirable.

The invention will be claimed at the end hereof, but will be first described in connection with the embodiment of it chosen from among other embodiments for illustration in the accompanying drawings, in which—

Figure 4:
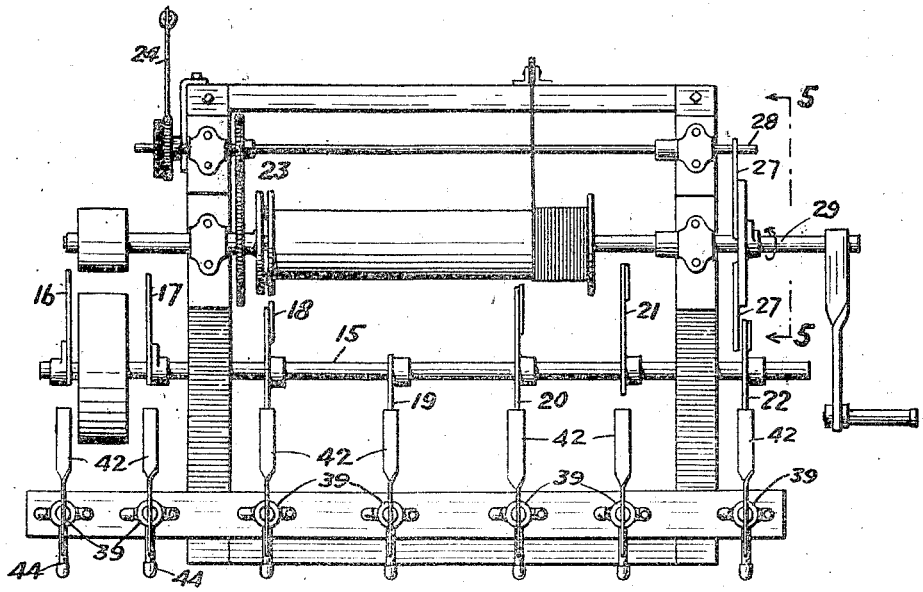
Figure 5:
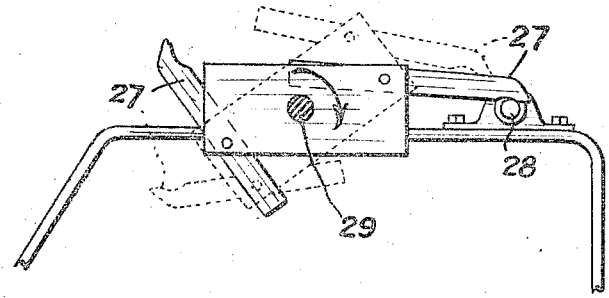

Figure 1, is a diagrammatic view illustrating for the sake of explanation a combination of apparatus constituting or embodying features of the invention. Fig. 2, is an end view, partly in section, illustrating features of the invention. Fig. 3, is a sectional view, drawn to an enlarged scale, and taken at right angles to the plane of Fig. 2 and showing a detail of construction. Fig. 4, is a top or plan view of a part of the apparatus shown in Fig. 2. Fig. 5, is a sectional view taken on the line 5—5 of Fig. 4, and Fig. 6, is a diagrammatic view illustrating a modification.

In Figs. 1 to 5 of the drawings 1, 2, and 3, are air valves for controlling the admission of the air blast from the main 4 to the generator 5, the carbureter 6 and the superheater 7. 8, and 9, are the hot valves for reversing the direction of flow through the generator 5. They are coupled together by a system of links and levers 10 by means of which when one is opened the other is closed. 11, is a stack valve. 12 is the oil supply valve and 13 is the steam supply valve. 14 is a 3-way valve connected with the system of links and levers 10 and by means of which the steam is directed either to the top or the bottom of the generator, according to the position of the hot valves.

The parts so far described, while constituting elements of the combination of this invention are not new in themselves and need not be of any unusual or novel construction. The operation of these parts, or more accurately, the relative operation or cycle of operations is well understood, and it is known that departures from the proper mode of operation may produce very dangerous results, among which mention may be made of the fact that if a blast valve is opened during the gas making period a more or less serious explosion would probably take place. These matters are referred to in order to bring out the fact that however obvious the desirability of an automatic control for a water gas set may be, nevertheless the attainment of that object is fraught not only with difficulty but also with danger.

15, is a lay, controlled or master shaft, and it is provided, as shown in the drawings, with cams, tappet-arms or projections 16, 17, 18, 19, 20, 21, and 22, one for each of the valves 1, 2, 3, 8, 9, 11, 12, 13, and 14, of the apparatus to be operated thereby. These valves will be referred to hereinafter as apparatus valves. There is one revolution of this shaft 15 for each cycle of operations and in consequence of this the shaft moves very slowly. For example, it may make a revolution in several minutes. Inasmuch as this shaft 15 controls the entire cycle of operations it is important that there should be means for preventing it from running too fast or running away and also for stopping it in case of trouble. The shaft is driven by clock-work 23. To stop the clock-work, use may be made of a weighted lever 24, adapted when released to arrest the pendulum 25 out of plumb and thus stop the clock-work, and adapted, when restrained by the cord 26, to free the pendulum and consequently let it swing and oscillate. To prevent the shaft from running away use is made of a governor consisting of pivotal arms 27 which at normal speed clear the projection 28, as shown in dotted lines in Fig. 5, but which at excessive speed strike the projection 28 and thus arrest the clock-work and the shaft 15. The arms constituting the governor are applied by the winding shaft 29 of the clock-work. Each of the described apparatus valves of the apparatus, with the exception of the stack valve, is self-closing in the sense that its operating-lever 30 is weighted as at 31 so as to cause the rods 32 to close the valve. In the case of the hot valves 8 and 9, their system of operating levers 10 is connected to one of the links 32 having a lever 30 which is weighted at 31. For each lever 30 there is a fluid cylinder and piston 33 connected by a pipe 34 to a fluid reservoir 35. There is a supply of compressed air, steam or the like 36, from which branch pipes 37 extend to each of the reservoirs 35 and these pipes may have interposed in them hand valves 38 and they do have interposed in them valves 39. The stems of the valves 39 are connected with levers 40, pivoted by means of links 41 and having their ends 42 in range of the cams 16 to 22 respectively. When the valves 39 are in the position shown in Fig. 3 they correspond to the position of the levers 40 shown in Fig. 2, so that the pipe 37 is in communication by means of a port 43 (extending centrally through the valve 39) with the exhaust pipe 44, but when the end of the lever 42 is raised up the port of the pipe 37 that leads to the reservoir 35 and is shown to the left in Fig. 3, is in communication with the other part of the pipe 37 shown to the right in Fig. 3, that leads to the air reservoir by way of the space afforded by the reduced portion of the valve 39. Considering any one valve and only one need be considered, since the rest are substantially the same, the end 45 of one of the cams 16 to 22 collides with the end 42 of the lever thus opening the valve 39 and holding it open as long as the end of the lever 42 rides on the surface of the cam, or tappet arm. Thereafter the spring 47 shifts the lever 40 so as to close the valve 39. When the valve 39 is open compressed air reaches the surface of the fluid in the reservoir 35 and acting on the latter causes it to flow through a hole in the check valve 48 and thus the piston 33 lifts the lever 30 through a long range and in consequence properly operates the valve connected with the lever 30 by the rod 32. When the lever 40 rides off the cam and is retracted by the spring 47, air is exhausted from the reservoir 35 and the weight 31 causes the piston 33 to move and also causes the rod 32 to move the valve. This movement is not unduly retarded because the check valve 48 opens. It is therefore evident that while the movement of the lever 40 under the influence of its cam is very slow and of comparatively short range, still the movement of the piston 33 and of the valve which it actuates is comparatively fast and of long range. The advantage of this is obvious. The parts 45 and 49 of the cams are adjustable as by means of the slot and pin connections 50. The purpose of this is to provide for an adjustment in the timing of the operation of the individual cams or tappet arms. The relative angular disposition of the tappet arms, cams or projections, or more accurately, the working ends of faces thereof in respect to the shaft 15 determines the order in which and the relative times at which the various valves of the apparatus are opened and closed.

Instead of relying upon gravity for closing the apparatus valves, they may be closed positively. One way of doing this is shown in Fig. 6, in which a pipe $34^a$ communicates with the cylinder 33 above its piston and with a reservoir $35^a$, having an air valve operated from the shaft 15 in the manner described.

It will be obvious to those skilled in the art that the invention is not limited to details of construction and arrangement as the same may widely vary without departing from the spirit of the invention, hence I do not limit the latter further than the prior state of the art and the following claims may require.

What I claim is:

1. In a water gas set the combination of a normally positioned apparatus valve, a fluid piston and cylinder for moving said valve, a reservoir in communication with said cylinder, a flow check valve between the reservoir and cylinder, an air supply in communication with the reservoir, an air valve having a normally retracted lever for controlling the air supply to the reservoir, and a rotating tappet-arm or cam for shifting and holding and subsequently releasing said lever.

2. In a water gas set the combination of a normally positioned apparatus valve, a fluid piston and cylinder for moving said valve, a reservoir in communication with said cylinder, an air supply in communication with the reservoir, an air valve having a normally retracted lever for controlling the air supply to the reservoir, and a rotating tappet-arm or cam for shifting and holding and subsequently releasing said lever.

3. An automatic water gas set comprising the combination of the apparatus valves, a series of fluid pistons and cylinders and reservoirs for operating the valves, a series of air valves and their connections for independently operating said fluid devices, and a rotating lay shaft having a series of cams adapted to open to hold open to close and to permit to remain closed said air valves and arranged on said shaft in different angular relations, whereby for each revolution of the shaft the apparatus valves are operated to complete the gas making cycle of operations.

4. An automatic water gas set comprising the combination of the apparatus valves, a series of fluid pistons and cylinders and reservoirs for operating the valves, a series of air valves and their connections for independently operating said fluid devices, and a rotating lay shaft having a series of cams adapted to open to hold open to close and permit to remain closed said air valves and arranged on said shaft in different angular relations, whereby for each revolution of the shaft the apparatus valves are operated to complete the gas making cycle of operations, and clock mechanism for rotating said lay shaft.

5. An automatic water gas set comprising the combination of the apparatus valves, a series of fluid pistons and cylinders and reservoirs for operating the valves, a series of air valves and their connections for independently operating said fluid devices, a rotating lay shaft having a series of cams adapted to open to hold open to close and to permit to remain closed said air valves and arranged on said shaft in different angular relations, whereby for each revolution of the shaft the apparatus valves are operated to complete the gas making cycle of operations, clock mechanism for rotating said lay shaft, and a speed governor mechanism for arresting said shaft.

6. An automatic water gas set comprising the combination of the apparatus valves, a series of fluid pistons and cylinders and reservoirs for operating the valves, a series of air valves and their connections for independently operating said fluid devices, a rotating lay shaft having a series of cams adapted to open to hold open to close and to permit to remain closed said air valves and arranged on said shaft in different angular relations, whereby for each revolution of the shaft the apparatus valves are operated to complete the gas making cycle of operations, clock mechanism for rotating said lay shaft, and means tending to arrest said clock mechanism and adapted to be restrained therefrom.

In testimony whereof I have hereunto signed my name.

CHARLES FRANKLIN ZEEK.

Witnesses:
   S. B. SCHNERR,
   O. B. EVANS.